US012358294B2

(12) United States Patent
Osakabe et al.

(10) Patent No.: US 12,358,294 B2
(45) Date of Patent: Jul. 15, 2025

(54) INK TANK AND INKJET PRINTER

(71) Applicant: BROTHER KOGYO KABUSHIKI KAISHA, Nagoya (JP)

(72) Inventors: Yoshinori Osakabe, Seto (JP); Taichi Shirono, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/638,031

(22) Filed: Apr. 17, 2024

(65) Prior Publication Data

US 2024/0343043 A1 Oct. 17, 2024

Related U.S. Application Data

(63) Continuation of application No. 17/812,222, filed on Jul. 13, 2022, now Pat. No. 11,993,086, which is a (Continued)

(30) Foreign Application Priority Data

Jan. 20, 2020 (CN) ......................... 202020133436.9
Jan. 20, 2020 (CN) ......................... 202020133797.3

(51) Int. Cl.
*B41J 2/175* (2006.01)

(52) U.S. Cl.
CPC ......... *B41J 2/1753* (2013.01); *B41J 2/17553* (2013.01)

(58) Field of Classification Search
CPC .................. B41J 2/1753; B41J 2/17553; B41J 2002/17579; B41J 2/17509; B41J 2/17513; B41J 2/17566; B41J 29/13
(Continued)

(56) References Cited

U.S. PATENT DOCUMENTS

2012/0019575 A1 1/2012 Campion et al.
2016/0263900 A1 9/2016 Kimura et al.
(Continued)

FOREIGN PATENT DOCUMENTS

CN 107031192 A 8/2017
JP 10-510353 A 10/1998
(Continued)

OTHER PUBLICATIONS

International Search Report issued in corresponding International Patent Application No. PCT/JP2021/001618, dated Mar. 23, 2021.
(Continued)

*Primary Examiner* — Jason S Uhlenhake
*Assistant Examiner* — Alexander D Shenderov
(74) *Attorney, Agent, or Firm* — Merchant & Gould P.C.

(57) ABSTRACT

An ink tank having an ink tank body, a first electrode member, and a second electrode member, is provided. The ink tank body includes an ink inlet, an ink reservoir chamber, an ink supplying section, a first restrictive side wall, a second restrictive side wall, a leaked-ink flow path, a first surface, a second surface, a connecting surface connecting the first surface and the second surface, and a restrictive section. The leaked-ink flow path is formed at least of a part of the first surface, a part of the connecting surface, a part of the second surface, the first restrictive side wall, and the second restrictive side wall. The restrictive section is arranged on the second surface between the first restrictive side wall and the second restrictive side wall. At least a part of the restrictive section is located between the connecting surface and the first electrode member.

10 Claims, 13 Drawing Sheets

Related U.S. Application Data continuation of application No. PCT/JP2021/001618, filed on Jan. 19, 2021.

(58) Field of Classification Search
USPC .......................................................... 347/86
See application file for complete search history.

(56) References Cited

U.S. PATENT DOCUMENTS

| | | | |
|---|---|---|---|
| 2016/0263905 | A1 | 9/2016 | Kimura et al. |
| 2016/0347071 | A1 | 12/2016 | Saeki et al. |
| 2017/0197429 | A1 | 7/2017 | Kimura et al. |
| 2019/0232669 | A1 | 8/2019 | Kudo et al. |

FOREIGN PATENT DOCUMENTS

| | | | |
|---|---|---|---|
| JP | 2016-168723 | A | 9/2016 |
| JP | 2016-168835 | A | 9/2016 |
| JP | 2016-221848 | A | 12/2016 |
| JP | 2017-123302 | A | 7/2017 |
| JP | 2019-130767 | A | 8/2019 |
| WO | 96/11385 | A1 | 4/1996 |

OTHER PUBLICATIONS

International Preliminary Report on Patentability and Written Opinion of the International Searching Authority issued in corresponding International Patent Application No. PCT/JP2021/001618, dated Jul. 26, 2022.

INK TANK AND INKJET PRINTER

REFERENCE TO RELATED APPLICATIONS

This is a Continuation Application of U.S. patent application Ser. No. 17/812,222, filed on Jul. 13, 2022, which is a Continuation Application of International Application No. PCT/JP2021/001618 filed on Jan. 19, 2021, which claims priority from Chinese Utility Model Applications Nos. 20/202,0133797.3 and 202020133436.9, both filed on Jan. 20, 2020. The entire contents of the prior applications are incorporated herein by reference.

BACKGROUND ART

An inkjet printer may record an image generally by discharging ink from a recorder at a recording medium, e.g., a recording sheet. FIG. 1 illustrates a conventional inkjet printer 1. For easier understanding of the following explanation, based on a position where a user may ordinarily use the inkjet printer 1, a side of the inkjet printer 1 to which the user faces is herein defined as "front," a side opposite to the front is defined as rear, a left-hand side to the user is defined as "left," and a right-hand side to the user is defined as "right."

As illustrated in FIG. 1, the inkjet printer 1 has a printer body 2, and four (4) ink tanks 10 are arranged on one side, e.g., the front side, of the printer body 2. The printer body 2 has a housing 50, and the ink tanks 10 are arranged inside the housing 50. One of the four ink tanks 10 is located in a leftward-front area in the housing 50, and the other three of the four ink tanks 10 are located in line in a rightward-front area in the housing 50. The ink tanks 10 are used to store inks and may supply the inks to a recorder 51. The ink tank 10 located in the leftward-front area may store ink in a color of black, and the three ink tanks located in the rightward-front area may store inks in colors of cyan, magenta, and yellow. In this composition, the inkjet printer 1 may record images in multiple colors.

As shown in FIG. 2, each ink tank 10 has an ink tank body 30, a first electrode member 61 and a second electrode member 62. The ink tank body 30 includes an ink reservoir chamber 31, an ink inlet 33, a buffer chamber 34, an ink supplying section 35, an air communication section 36, and a leaked-ink flow path 55.

In particular, the ink tank body 30 mainly has a resin housing 52, a first film 53, and a second film 54. The resin housing 52 may be formed in injection molding. The first film 53 covers one side, e.g., a leftward side, of the resin housing 52. The second film 54 covers another side, e.g., a rightward side, of the resin housing 52. The resin housing 52 has a hollow recess having a plurality of inner compartments that form, for example, the ink reservoir chamber 31 and the buffer chamber 34. The inner recess has sideward openings, e.g., a leftward opening, which is open leftward, and a rightward opening, which is open rightward. The first film 53 covers the leftward opening by being, for example, adhered to the resin housing 52 and thereby form the ink reservoir chamber 31 in cooperation with the resin housing 52. The second film 54 covers the rightward opening by being, for example, adhered to the resin housing 52 and thereby form the buffer chamber 34 in cooperation with the resin housing 52. The ink inlet 33, the ink supplying section 35, the air communication section 36, and the leaked-ink flow path 55 are arranged in the resin housing 52.

The ink reservoir chamber 31 may store the ink to be supplied to the recorder 51. The ink inlet 33 is located above the ink reservoir chamber 31, and the ink may be poured into the ink reservoir chamber 31 through the ink inlet 33. The ink supplying section 35 is located above the ink reservoir chamber 31 and may supply the ink in the ink reservoir chamber 31 to the recorder 51. The air communication section 36 is located at a lower position in the ink tank body 30. The buffer chamber 34 connects the air communication section 36 and the ink reservoir chamber 31, and the air communication section 36 is continuous with the atmosphere. The leaked-ink flow path 55 is arranged on an outer surface of the ink tank body 30 and may guide the ink leaking out of the ink inlet 33 and the ink supplying section 35 to a predetermined position.

The first electrode member 61 and the second electrode member 62 extend from the outside of the ink tank body 30 into the inside of the ink reservoir chamber 31. The first electrode member 61 is arranged in the leaked-ink flow path 55, and the second electrode member 62 is arranged on the outside of the leaked-ink flow path 55. The first electrode member 61 and the second electrode member 62 form parts of an electrode-styled sensor. When the ink contacts both the first electrode member 61 and the second electrode member 62, the ink conducts electricity between the first electrode member 61 and the second electrode member 62, and the electrode-styled sensor may detect an amount of the ink in the ink reservoir chamber 31.

When, for example, the user supplies the ink in the ink reservoir chamber 31 through the ink inlet 33, the ink may leak from the ink inlet 33. For another example, when an ink supplying tube connected to ink supplying section 35 is damaged, the ink may leak outside the ink supplying tube. The leaked ink may flow downward along the leaked-ink flow path 55 and may be absorbed by an absorber, which is arranged outside the ink tank body 30; thereby, the ink may be prevented from flowing to other areas in the inkjet printer 1.

DESCRIPTION

Meanwhile, the first electrode member 61 is arranged in the leaked-ink flow path 55, and, when the ink leaks in the circumstances as described above, the ink may adhere to remain on a surface of the first electrode member 61. Therefore, when the ink adheres to a surface of the second electrode member 62 simultaneously with the first electrode member 61, the ink may conduct electricity between the first electrode member 61 and the second electrode member 62, and the sensor may erroneously detect the adhered ink as the ink remaining substantially in the ink reservoir chamber 31.

The present disclosure is advantageous in that an ink tank and an inkjet printer, in which at least a part of the problems described above is overcome, are provided.

In the paragraphs below, on one hand, detailed description of embodiments may help a reader to understand the present disclosure. On the other hand, in order to avoid confusion of the embodiments of the present disclosure with the known configurations, description of the configurations that may be easily understood by those with ordinary skills in the art may be herein omitted.

In the following paragraphs, the embodiments of the present disclosure will be described with reference to the accompanying drawings. In the description below, terms related to positions or directions such as "up," "down," etc. may not necessarily limit the scope of the present disclosure. Moreover, ordinal numbers assigned to some items in the embodiment below, such as "first," "second," etc., are used merely in a purpose to distinguish them clearly from one another in the context and may not necessarily imply specific meanings, such as order or significance. Furthermore, for example, terms such as "first member" may not necessarily imply presence of "second member", or "second member" may not necessarily imply presence of "first member."

Below described will be an inkjet printer according to the embodiments of the present disclosure. The inkjet printer according to the embodiments of the present disclosure has a printing function and may be in a generally similar configuration to the above-mentioned known inkjet printer 1. Optionally, the inkjet printer according to the present disclosure may have multiple functions, including an image scanning function, a facsimile transmission/receiving function, and a copying function, additionally to the printing function. The printing function may include a double-side printing function, by which images may be recorded on both sides of a recording sheet.

First Embodiment

Figure 1:
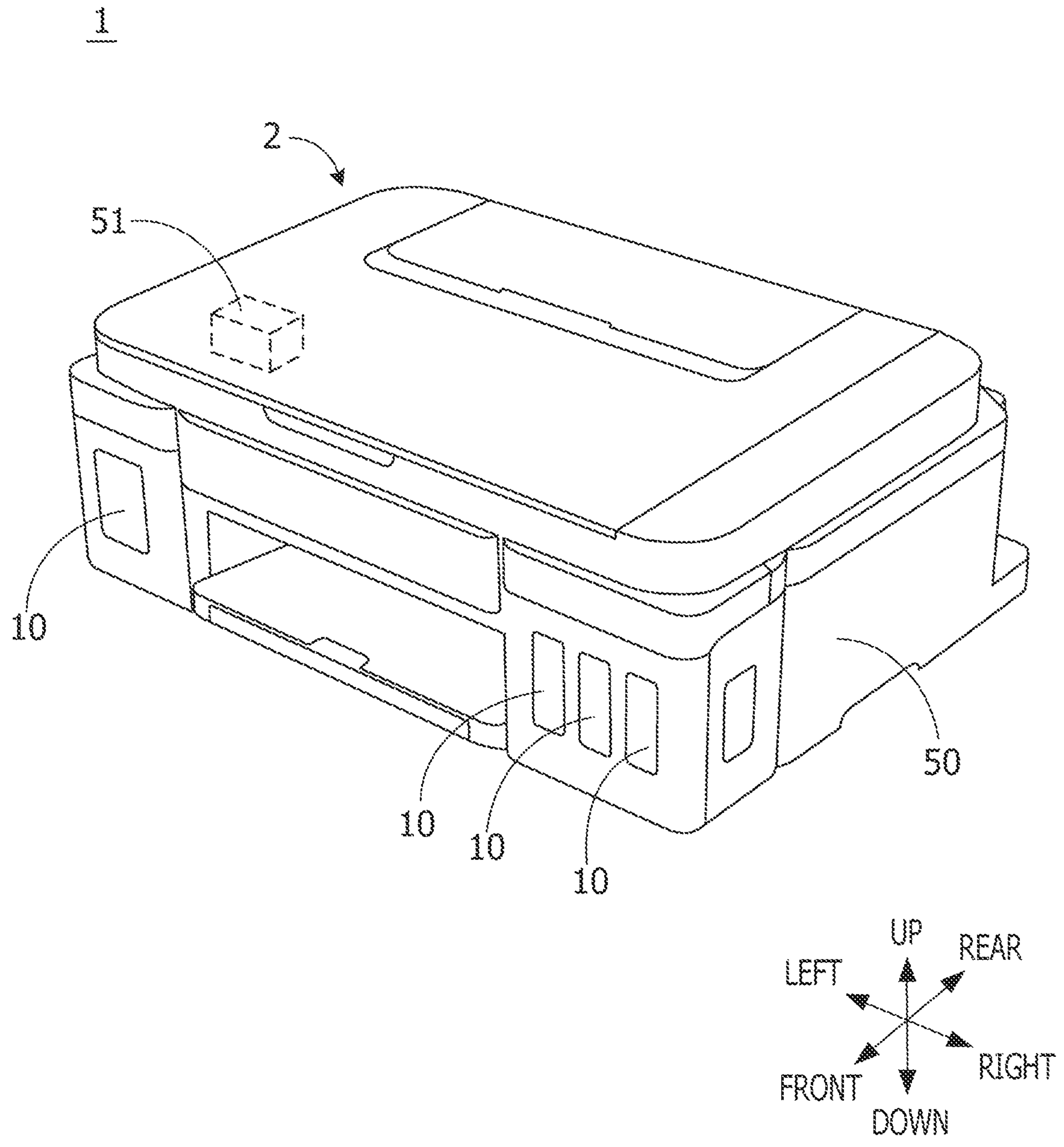
FIG. 1 is a perspective view of a conventional inkjet printer.
Figure 2:
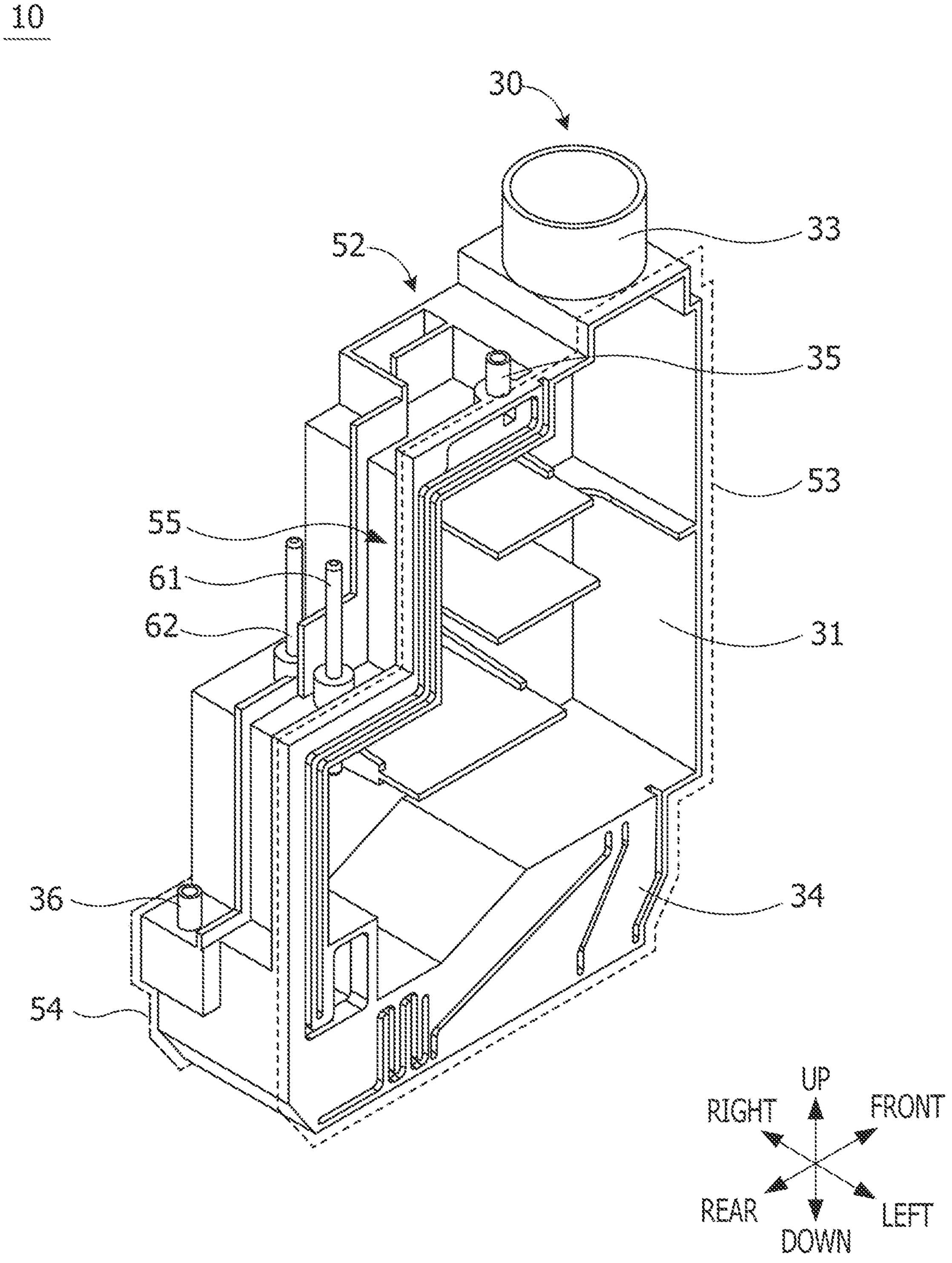
FIG. 2 is a perspective view of an ink tank mountable in the conventional inkjet printer.
Figure 3:
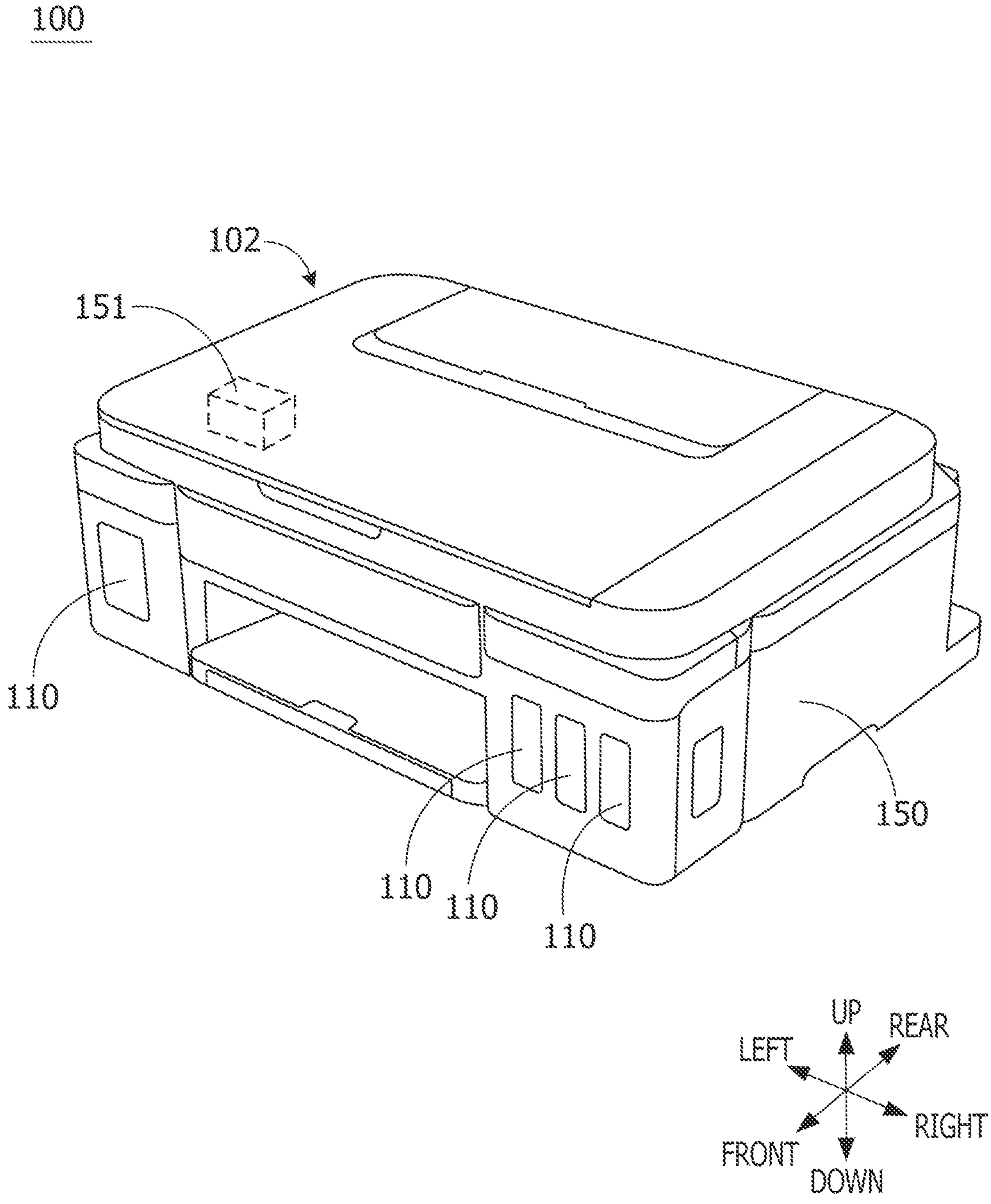
FIG. 3 is a perspective view of an inkjet printer.
Figure 4:
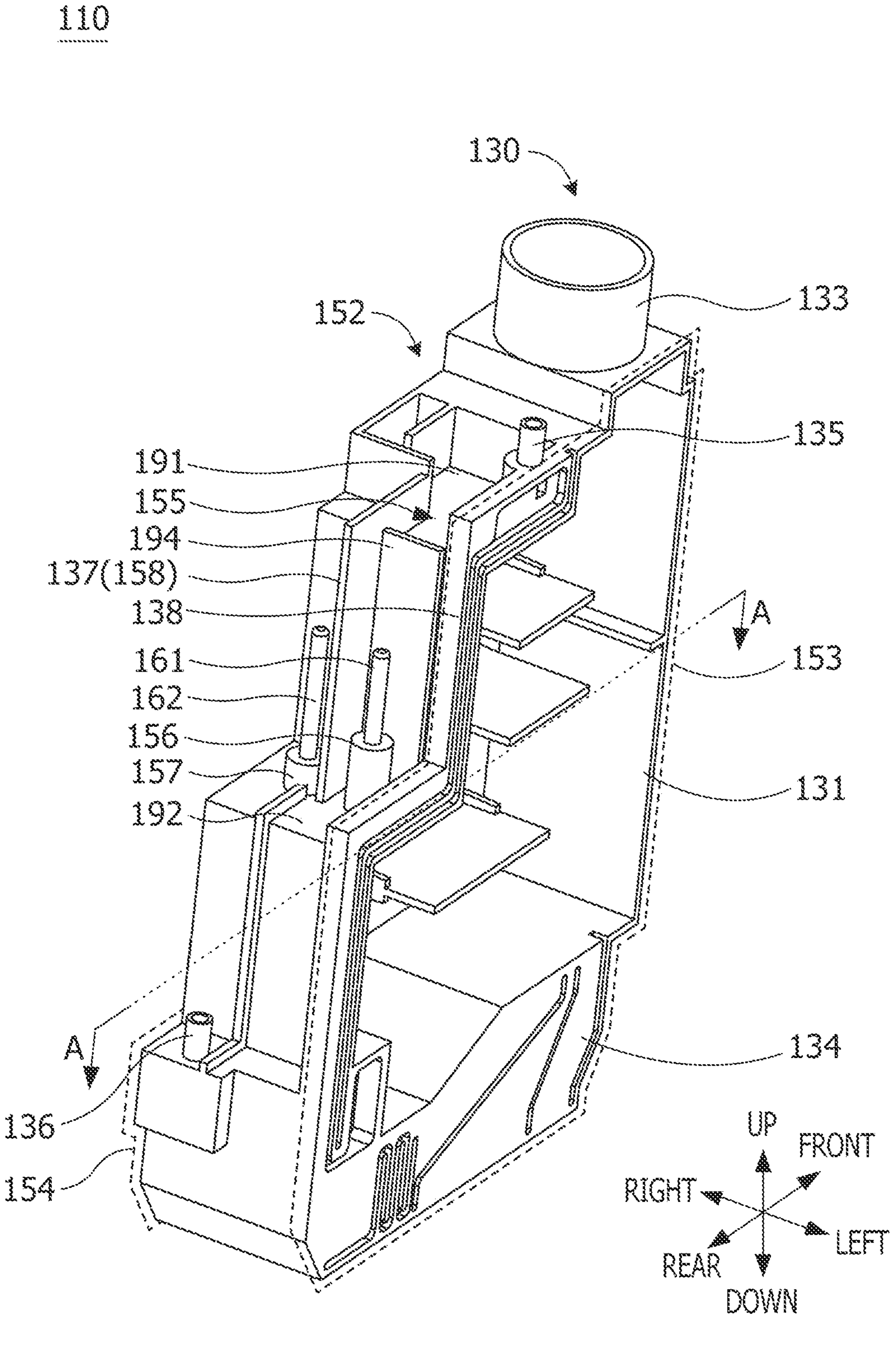
FIG. 4 is a perspective view of an ink tank mountable in the inkjet printer shown in FIG. 3.
Figure 5:
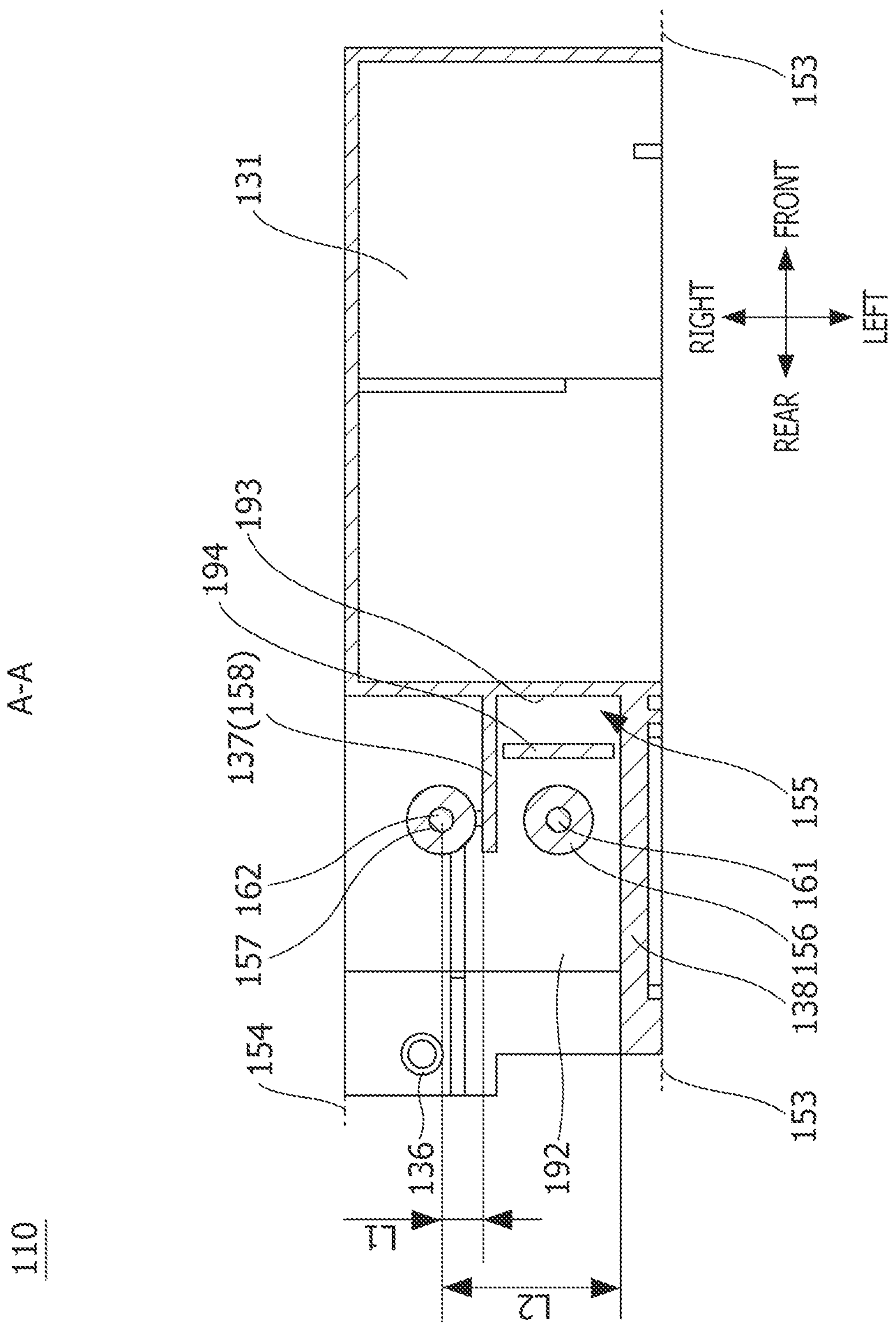
FIG. 5 is a cross-sectional view of the ink tank sectioned at a line A-A in FIG. 4.

FIG. 3 illustrates an inkjet printer 100 according to a first embodiment of the present disclosure. FIGS. 4-5 illustrate an ink tank 110 according to the first embodiment of the present disclosure.

As shown in FIG. 3, the inkjet printer 100 has a printer body 102 and the ink tanks 110.

The printer body 102 has a substantially rectangular parallelepiped form. In the printer body 102, a feeder device for feeding recording sheets and an ejection device for ejecting the sheets are arranged (not shown). Inside the printer body 102, a recorder 151 having, for example, a plurality of nozzles is arranged, and the recorder 151 may discharge ink at the recording sheet being fed from the feeder device. On a front side of the printer body 102, optionally, an operation panel may be arranged. The operation panel may have a display member, through which various types of information and settings may be displayed, and operation keys, through which operations and setting information may be entered. Optionally, the operation panel may not have the display member but may have the operation keys alone. The operation keys may not necessarily be located on the front side but may optionally be located on, for example, an upper side of the printer body 102.

The printer body 102 of the inkjet printer 100 has a housing 150. The inkjet printer 100 has four (4) ink tanks 110, which are arranged inside the housing 150. One of the ink tanks 110 is located in a leftward-front area in the printer body 102 and may contain ink in black. The other three (3) ink tanks 110 are located in a rightward-front area in the printer body 102 and may contain colored inks in cyan, magenta, and yellow, in this given order from left to right. Thereby, the inkjet printer 100 may record multicolored images in the combined inks in the four colors of black, cyan, magenta, and yellow. However, the number of the ink tanks 110 may not necessarily be limited to four but may be other number than four. Optionally, the ink tanks 110 may be arranged at different positions in the printer body 102. Moreover, optionally, the ink tanks 110 may be inseparably attached to the printer body 102 or may be detachably attached to the printer body 102.

Some items of the ink tank 110 according to the first embodiment may be in a substantially similar configuration to the known ink tank 10 mentioned above. Those items will be referred to by similar reference signs, in which lower two digits may be the same as those in the known ink tank 10.

As shown in FIG. 4, the ink tank 110 includes an ink tank body 130, a first electrode member 161, and a second electrode member 162. The ink tank body 130 includes an ink reservoir chamber 131, an ink inlet 33, a buffer chamber 134, an ink supplying section 135, an air communication section 136, and a leaked-ink flow path 155. In particular, the ink tank body 130 mainly has a resin housing 152, a first film 153, and a second film 154. The first film 153 is located on a leftward side of the resin housing 152, and thereby the first film 153 together with the resin housing 152 forms the ink reservoir chamber 131. The second film 154 is located on a rightward side of the resin housing 152, and thereby the second film 154 together with the resin housing 152 forms the buffer chamber 134. The ink inlet 133, the ink supplying section 135, the air communication section 136, and the leaked-ink flow path 155 are arranged in the resin housing 152.

The ink reservoir chamber 131 may store the ink to be supplied to the recorder 151. The ink inlet 133 is continuous with the ink reservoir chamber 131, and the ink may be poured into the ink reservoir chamber 131 through the ink inlet 133. The ink supplying section 135 is continuous with the ink reservoir chamber 131 and is located on a first surface 191 of the ink tank body 130. Through the ink supplying section 135, the ink in the ink reservoir chamber 131 may be supplied to the recorder 151. The ink inlet 133 is located at a position higher than the first surface 191 and frontward with respect to the ink supplying section 135. The air communication section 136 is located at a lower position in the ink tank body 130. The buffer chamber 134 connects the air communication section 136 and the ink reservoir chamber 131, and the air communication section 136 is continuous with the outside atmosphere.

As shown in FIGS. 4 and 5, the ink tank body 130 further has a first restrictive side wall 137 and a second restrictive side wall 138. The first restrictive side wall 137 extends from the first surface 191 along a connecting surface 193 to a second surface 192. The second restrictive side wall 138 extends from the first surface 191 along the connecting surface 193 to the second surface 192.

More specifically, the first surface 191 is located to be higher than the second surface 192, an upper end of the connecting surface 193 is connected with the first surface

191, and a lower end of the connecting surface 193 is connected with the second surface 192. In the present embodiment, the first surface 191, the second surface 192, and the connecting surface 193 are plane surfaces.

When the inkjet printer 100 is in a usable condition, the first surface 191 is located frontward with respect to the second surface 192, the first surface 191 and the second surface 192 are horizontal planes, and the connecting surface 193 is a vertical plane.

A part of the first surface 191, a part of the connecting surface 193, and a part of the second surface 192, which are located between the first restrictive side wall 137 and the second restrictive side wall 138, the first restrictive side wall 137, and the second restrictive side wall 138 form the leaked-ink flow path 155. In other words, the leaked-ink flow path 155 is formed at least of a part of the first surface 191, a part of the connecting surface 193, and a part of the second surface 192, which are located between the first restrictive side wall 137 and the second restrictive side wall 138, the first restrictive side wall 137, and the second restrictive side wall 138. The leaked-ink flow path 155 may guide the ink leaked out of the ink inlet 133 and the ink supplying section 135 to a predetermined position.

The first electrode member 161 is arranged on the second surface 192 and extends from the outside of the ink tank body 130 into the inside of the ink reservoir chamber 131. The first electrode member 161 is located in the leaked-ink flow path 155. The second electrode member 162 is arranged on the second surface 192 and extends from the outside of the ink tank body 130 into the inside of the ink reservoir chamber 131. The second electrode member 162 is located apart from the first electrode member 161 and is located on the outside of the leaked-ink flow path 155.

In the present embodiment, for avoiding erroneous detection of the ink, the ink tank body 130 has a restrictive section 194 on the second surface 192. The restrictive section 194 is located between the first restrictive side wall 137 and the second restrictive side wall 138. Moreover, the restrictive section 194 is at least partly located between the connecting surface 193 and the first electrode member 161. Therefore, the ink splashing on the leaked-ink flow path 155 may be restrained from reaching the first electrode member 161 and may be restrained from adhering to the first electrode member 161.

It is preferable that the restrictive section 194 is separated from at least one of the first restrictive side wall 137 and the second restrictive side wall 138 by a gap. In the present embodiment, the restrictive section 194 has a form of a plate extending along the vertical direction. The restrictive section 194 is separated from the first restrictive side wall 137 on the rightward side and from the second restrictive side wall 138 on the leftward side. In this arrangement, the ink in the leaked-ink flow path 155 may flow downward through a gap between a rightward edge of the restrictive section 194 and the first restrictive side wall 137 and a gap between a leftward edge of the restrictive section 194 and the second restrictive side wall 138 to a predetermined position. Moreover, the restrictive section 194 is closer than the first electrode member 161 to the first restrictive side wall 137 and is closer than the first electrode member 161 to the second restrictive side wall 138.

It is preferable that a position of an upper end of the restrictive section 194 is higher than an upper end of the first electrode member 161 and is higher than the first surface 191.

Referring back to FIG. 5, a minimum distance L1 between the second electrode member 162 and the first restrictive side wall 137 is shorter than a minimum distance L2 between the second electrode member 162 and the second restrictive side wall 138. The first restrictive side wall 137 has a first wall 158. A lower end of the first wall 158 is connected to the second surface 192, a frontward end of the first wall 158 is connected to the connecting surface 193, and a position of an upper end of the first wall 158 is higher than the restrictive section 194.

The first wall 158 may restrict the ink in the leaked-ink flow path 155 from flowing outside the leaked-ink flow path 155. Moreover, in cooperation with the restrictive section 194, the first wall 158 may restrict the ink in the leaked-ink flow path 155 from splashing onto the first electrode member 161.

The ink tank body 130 may further have a first cover section 156 and a second cover section 157 on the second surface 192. The first cover section 156 is arranged to surround an outer circumference of the first electrode member 161. An upper end of the first cover section 156 is lower than the upper end of the first electrode member 161. In this arrangement, the ink in the leaked-ink flow path 155 may be restrained from adhering to the first electrode member 161. The second cover section 157 is arranged to surround an outer circumference of the second electrode member 162. An upper end of the second cover section 157 is lower than an upper end of the second electrode member 162. In this arrangement, the ink leaked out of the ink inlet 133 and the ink supplying section 135 may be restrained from adhering to the second electrode member 162. Preferably, the upper end of the first cover section 156 may be located to be higher than the upper end of the second cover section 157.

Figure 6:
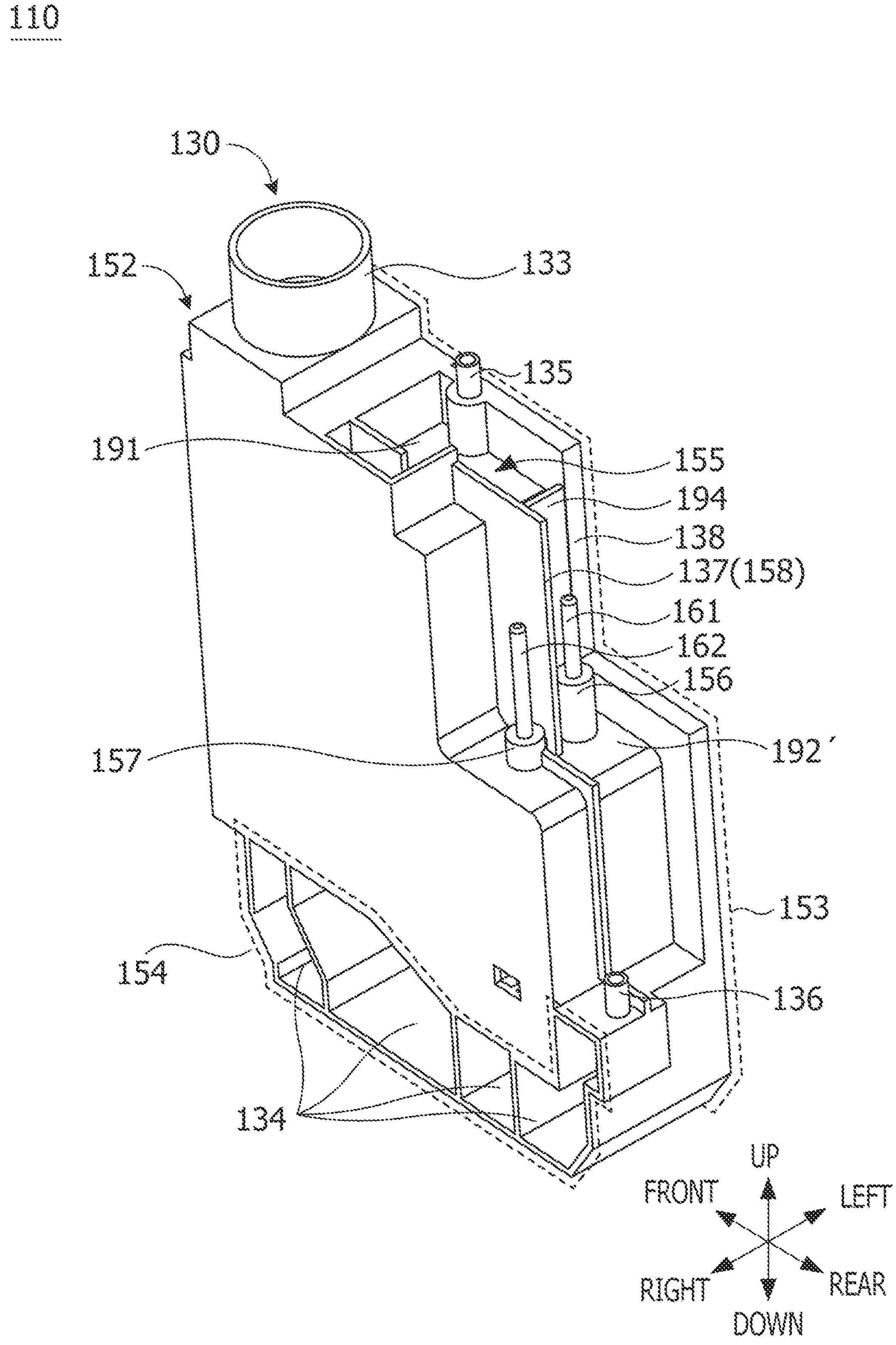
FIG. 6 is a perspective view of a modified example of the ink tank shown in FIG. 4.

FIG. 6 shows a modified ink tank 110 according to the first embodiment of the present disclosure. Some items of the modified ink tank 110 may be in substantially similar configurations to those in the ink tank 110 described above. Those items will be referred to by the same or similar reference signs. In particular, the modified ink tank 110 may be different from the ink tank 110 described above in that a second surface 192' includes a round surface with no edge point. More specifically, the second surface 192' may have a plane section and round sections, which are connected with the plane section and located frontward and rearward with respect to the plane section. The round sections may be arranged to contact the plane section at the positions where the round sections are connected to the plane section. However, as may be understood by a person with ordinary skills in the art, the form of the second surface 192' may not necessarily be limited to that in the modified ink tank 110 but may be, for example, in a form such that the second surface 192' has no plane section.

Second Embodiment

Figure 7:
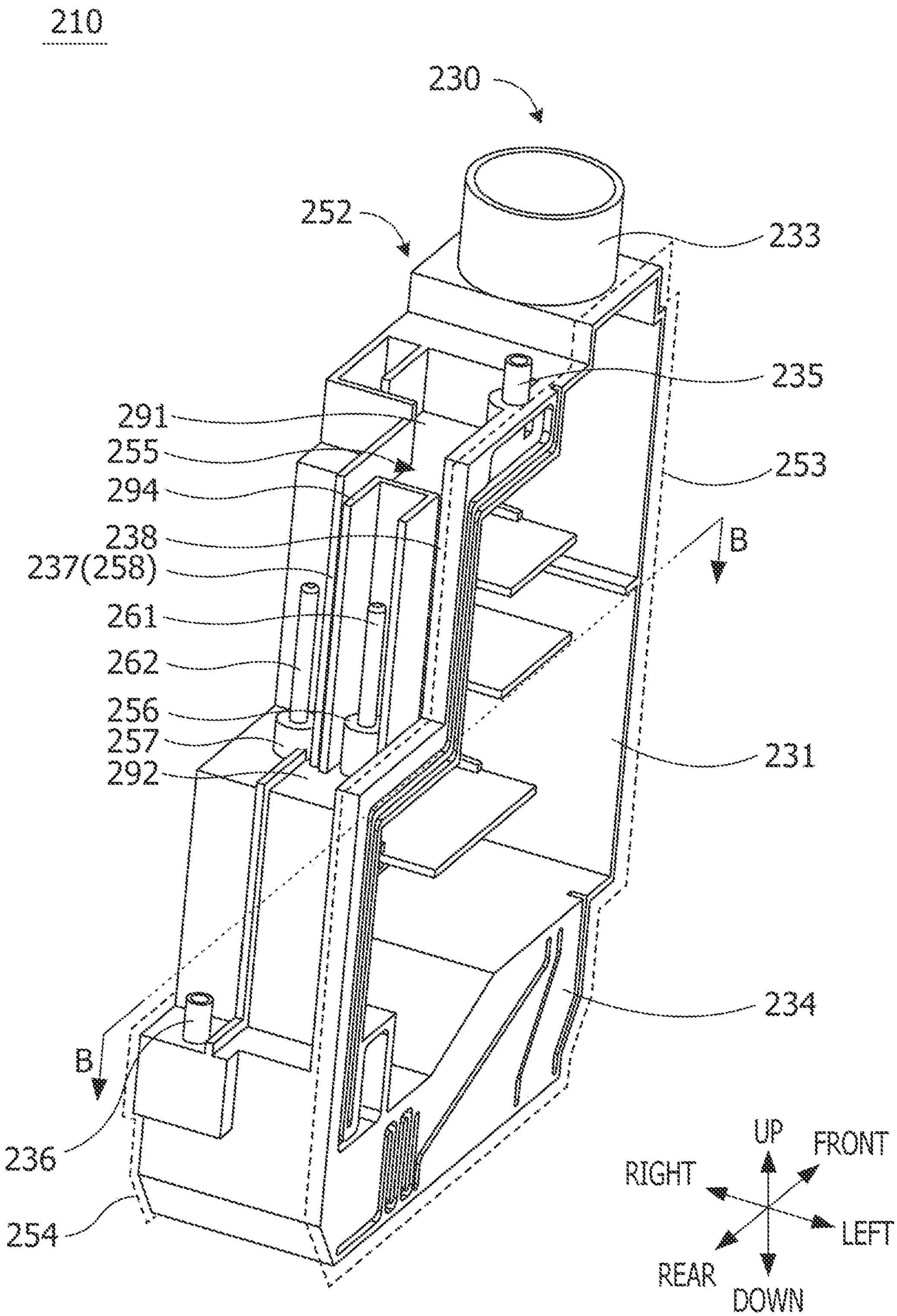
FIG. 7 is a perspective view of another ink tank mountable in the inkjet printer.
Figure 8:
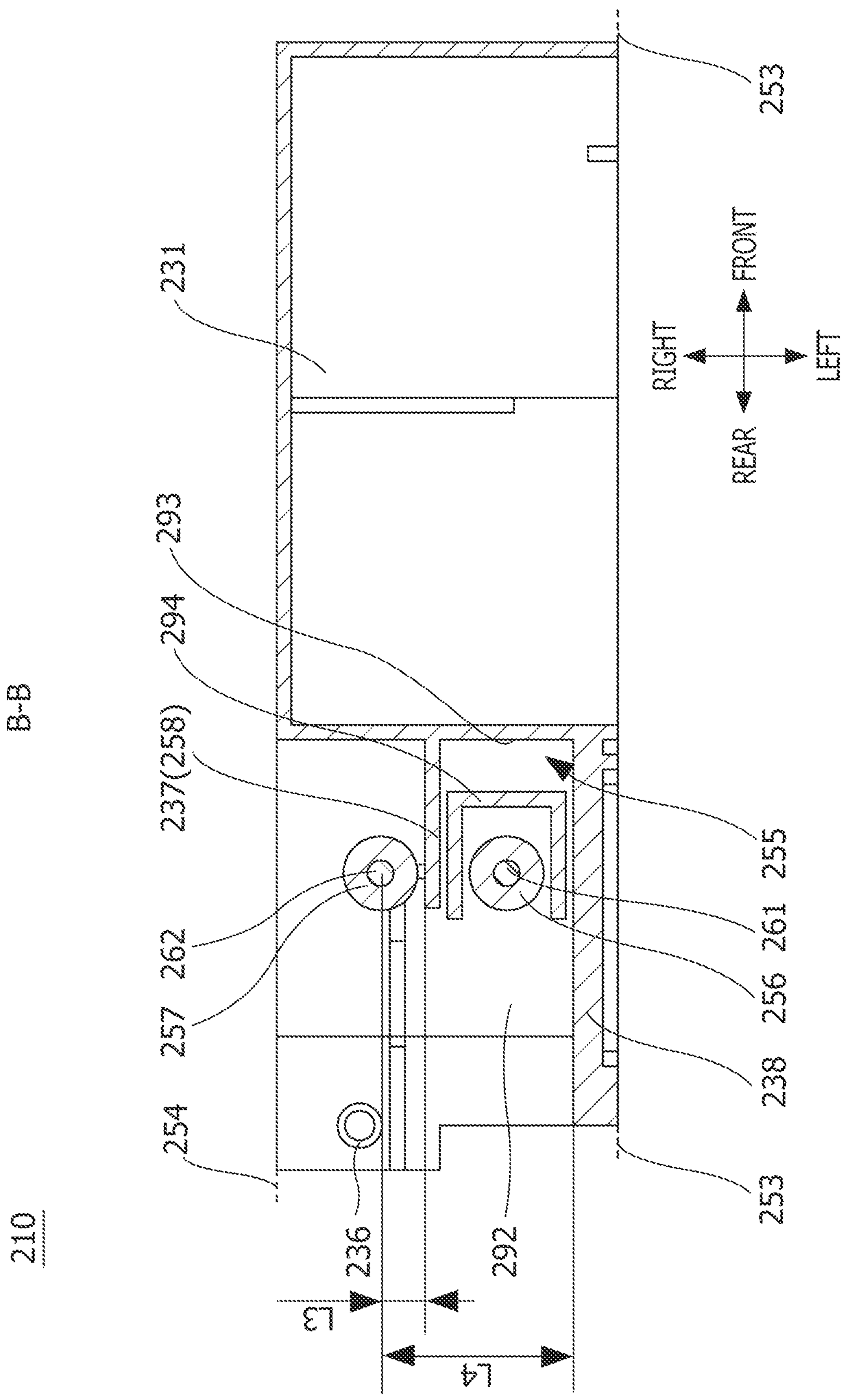
FIG. 8 is a cross-sectional view of the ink tank sectioned at a line B-B in FIG. 7.

Below will be described an ink tank 210 according to a second embodiment. As shown in FIGS. 7-8, some items of the ink tank 210 may be in substantially similar configurations to those the ink tank 110 in the first embodiment. Those items will be referred to by the same or similar reference signs.

In particular, the ink tank 210 includes, similarly to the ink tank 110 in the first embodiment, an ink tank body 230, a first electrode member 261, and a second electrode member 262. The ink tank body 230 includes, similarly to the ink tank 110, a resin housing 252, a first film 253, and a second film 254. The first film 253 together with the resin housing 252 forms an ink reservoir chamber 231, similarly to the first film 153. The second film 254 together with the resin housing 252 forms a buffer chamber 234, similarly to the second film 54. An ink inlet 233, an ink supplying section 235, an air communication section 236, and a leaked-ink flow path 255, a first cover section 256, and a second cover section 257 are arranged in the resin housing 252, similarly to those in the resin housing 152. The leaked-ink flow path 255 is formed at least of a first restrictive side wall 237, a second restrictive side wall 238, a first surface 291, a second surface 292, and a connecting surface 293.

As shown in FIG. 8, a minimum distance L3 between the second electrode member 262 and the first restrictive side wall 237 is shorter than a minimum distance L4 between the second electrode member 262 and the second restrictive side wall 238. The first restrictive side wall 237 has a first wall 258. The ink tank 210 of the second embodiment may be different from the ink tank 110 in the first embodiment in that a restrictive section 294, extending along the vertical direction, has a concave horizontal cross section surrounding the first electrode member 261 from three sides. In particular, the restrictive section 294 surrounds a leftward side, a frontward side, and a rightward side of the first electrode member 261 integrally so that the ink in the leaked-ink flow path 255 may be restrained more securely from splashing onto the first electrode member 261.

According to the ink tank 210 of the second embodiment, with the restrictive section 294 arranged on the second surface, at least a part of the restrictive section 294 is located between the connecting surface 293 and the first electrode member 261; therefore, the ink flowing in the leaked-ink flow path 255 may be restrained from splashing onto the first electrode member 261 and from adhering to the first electrode member 261. Thus, erroneous detection of the amount of the ink in the ink reservoir chamber 231 may be avoided.

Third Embodiment

Figure 9:
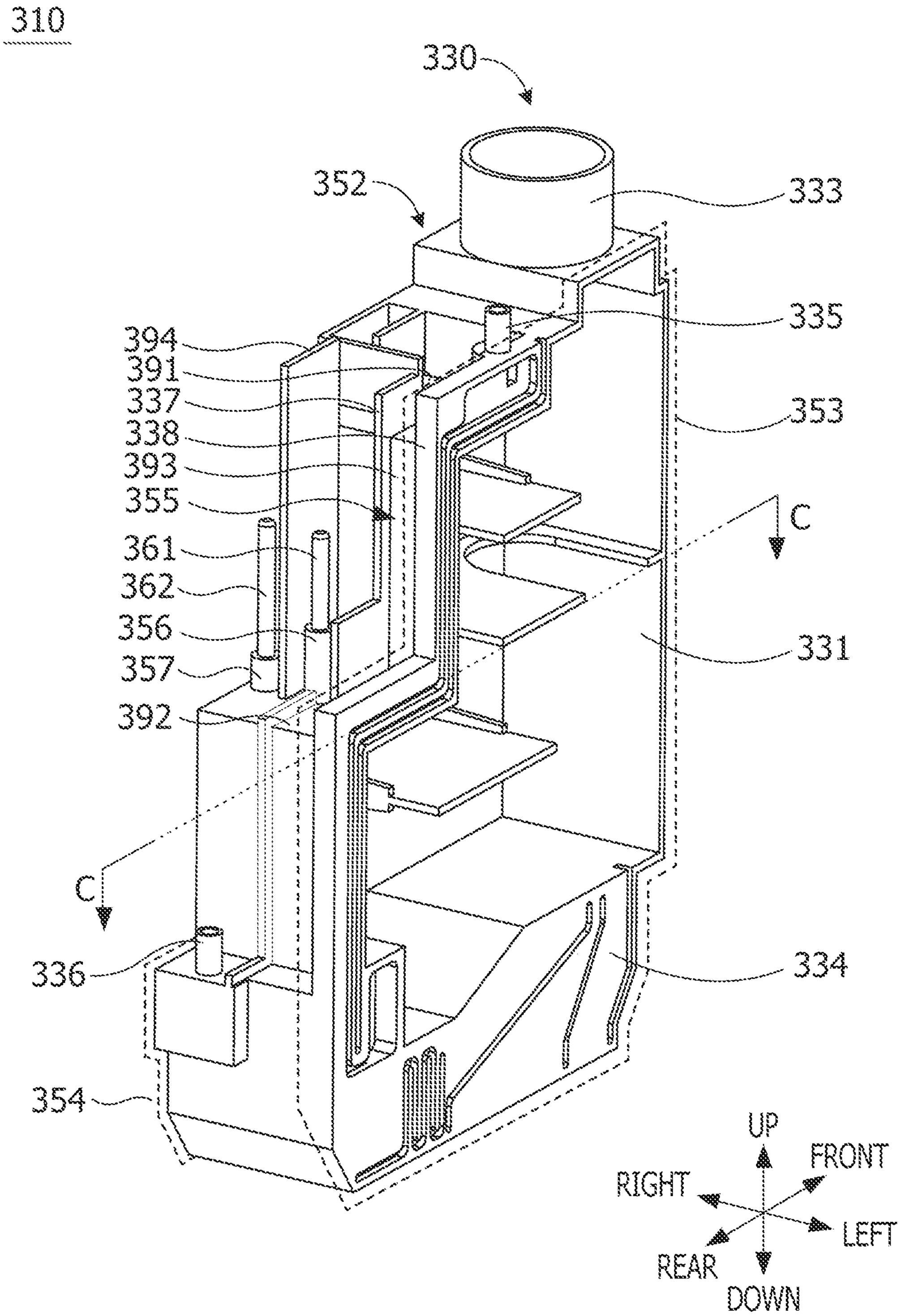
FIG. 9 is a perspective view of another ink tank mountable in the inkjet printer.
Figure 10:
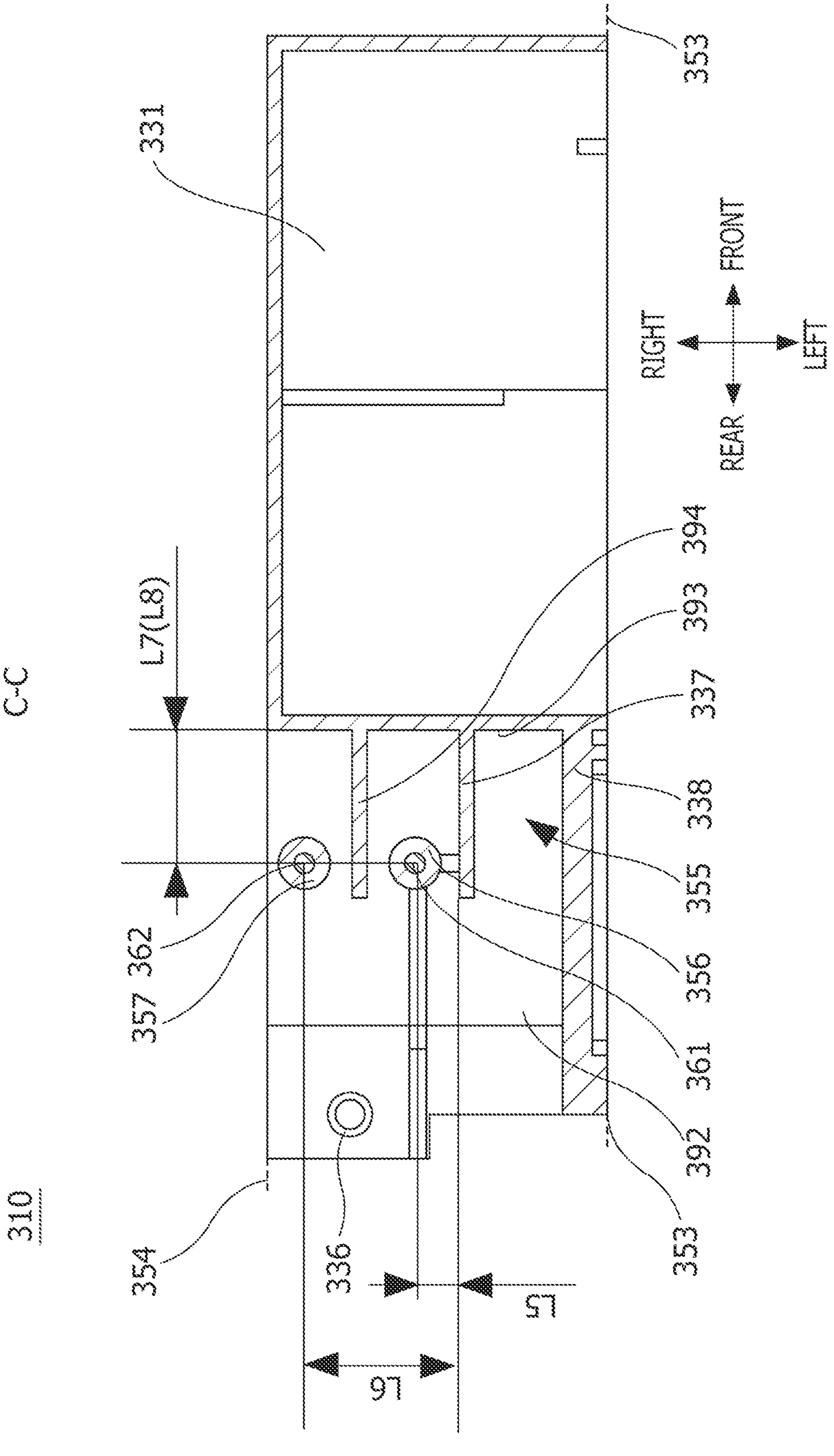
FIG. 10 is a cross-sectional view of the ink tank sectioned at a line C-C in FIG. 9.

Below described will be an ink tank 310 according to the third embodiment. As shown in FIGS. 9-10, the ink tank 310 includes a first restrictive side wall 337 and a second restrictive side wall 338. The first restrictive side wall 337 extends from a first surface 391 along a connecting surface 393 to a second surface 392. The second restrictive side wall 338 extends from the first surface 391 along the connecting surface 393 to the second surface 392.

In particular, the first surface 391 is located to be higher than the second surface 392, an upper end of the connecting surface 393 is connected with the first surface 391, and a lower end of the connecting surface 393 is connected with the second surface 292. In the present embodiment, the first surface 391, the second surface 392, and the connecting surface 393 are plane surfaces.

When the inkjet printer 100 is in a usable condition, the first surface 391 is located frontward with respect to the second surface 392, the first surface 391 and the second surface 392 are horizontal planes, and the connecting surface 393 is a vertical plane.

The first surface 391, the connecting surface 393, and the second surface 392, which are located between the first restrictive side wall 337 and the second restrictive side wall 338, the first restrictive side wall 337, and the second restrictive side wall 338 form a leaked-ink flow path 355. The leaked-ink flow path 355 may guide the ink leaked out of the ink inlet 333 and the ink supplying section 335 to a predetermined position.

The first electrode member 361 is arranged on the second surface 392 and extends from the outside of the ink tank body 330 into the inside of the ink reservoir chamber 331. The second electrode member 362 is arranged on the second surface 392 and extends from the outside of the ink tank body 330 into the inside of the ink reservoir chamber 331.

The second electrode member 362 is separated from the first electrode member 361, and the second electrode member 362 and the first electrode member 361 are located outside the leaked-ink flow path 355. Therefore, the ink in the leaked-ink flow path 355 may be restrained from splashing onto the first electrode member 361 or the second electrode member 362. Moreover, the ink leaked out of the ink inlet 333 and the ink supplying section 335 may be restrained from adhering to the first electrode member 361 or the second electrode member 362. In this arrangement, erroneous detection of the amount of the ink in the ink reservoir chamber 331 may be avoided. In particular, a minimum distance L5 between the first electrode member 361 and the first restrictive side wall 337 is shorter than a minimum distance L6 between the second electrode member 362 and the first restrictive side wall 337. A minimum distance L7 between the first electrode member 361 and the connecting surface 393 is equal to a minimum distance L8 between the second electrode member 362 and the connecting surface 393.

The ink tank body 330 may further have a restrictive section 394. In the present embodiment, the restrictive section 394 has a form of a plate extending along the vertical direction. A lower end of the restrictive section 394 is connected with the second surface 392, and a frontward end of the restrictive section 394 is connected with the connecting surface 393. The restrictive section 394 is located between the first electrode member 361 and the second electrode member 362. In this arrangement, the first electrode member 361 and the second electrode member 362 are separated, and the ink leaked out of the ink inlet 333 and the ink supplying section 335 may be restrained from splashing onto the second electrode member 362. It is preferable that an upper end of the restrictive section 394 is located to be higher than a position of the upper end of the first restrictive side wall 337, and the upper end of the restrictive section 394 is located to be higher than a position of an upper end of the second restrictive side wall 338.

The ink tank body 330 may further have a first cover section 356 and a second cover section 357 on the second surface 392. The first cover section 356 is arranged to surround an outer circumference of the first electrode member 361. An upper end of the first cover section 356 is lower than the upper end of the first electrode member 361. In this arrangement, the ink leaked out of the ink inlet 333 and the ink supplying section 335 may be restrained from adhering to the first electrode member 361.

The second cover section 357 is arranged to surround an outer circumference of the second electrode member 362. An upper end of the second cover section 357 is lower than an upper end of the second electrode member 362. In this arrangement, the ink leaked out of the ink inlet 333 and the ink supplying section 335 may be restrained from adhering to the second electrode member 362. It is preferable that the upper end of the first cover section 356 is located to be higher than the upper end of the second cover section 357.

Figure 11:
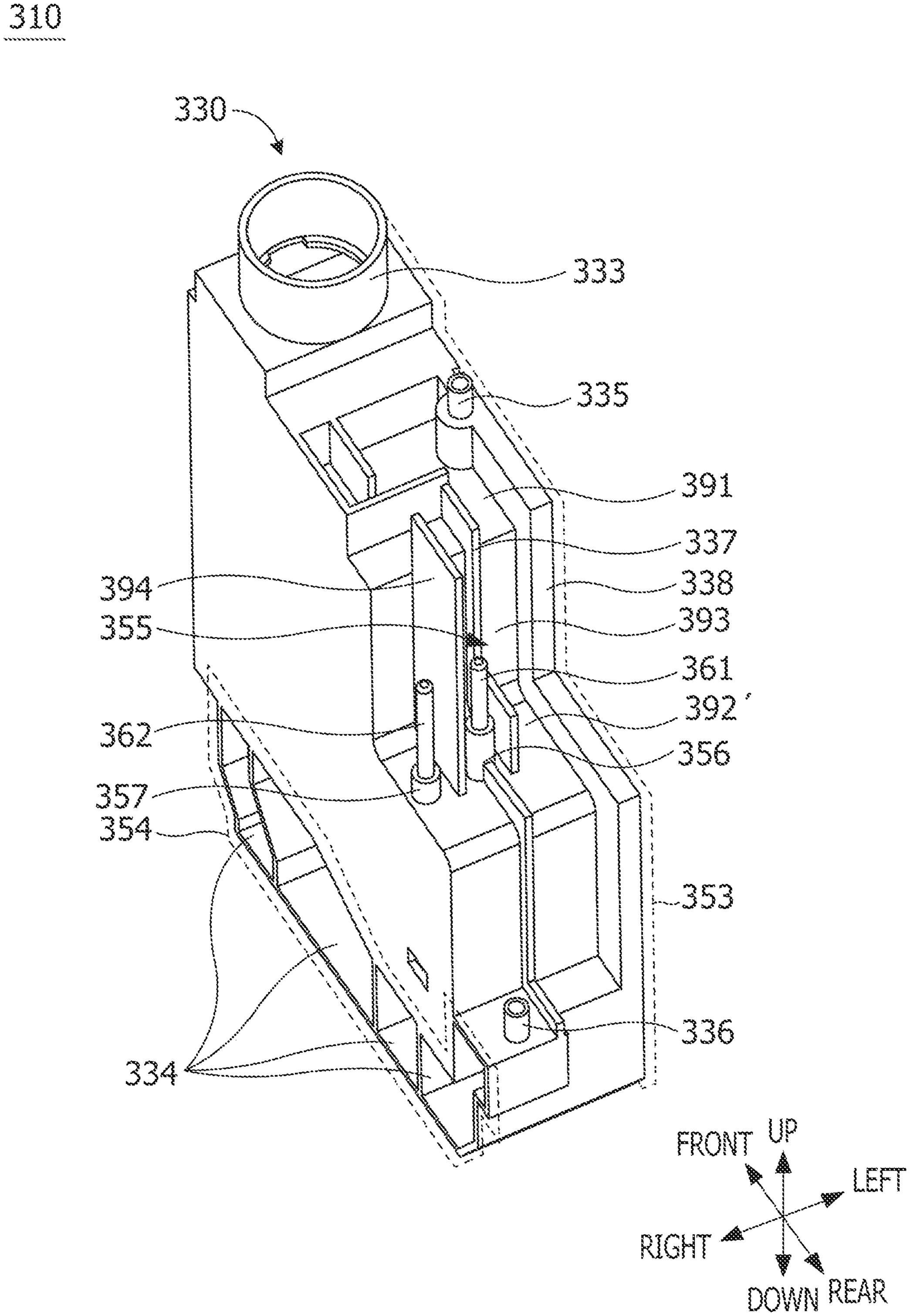
FIG. 11 is a perspective view of a modified example of the ink tank shown in FIG. 9.

FIG. 11 shows a modified ink tank 310 according to the third embodiment of the present disclosure. Some items of the modified ink tank 310 may be in substantially similar configurations to those in the ink tank 310 described above. Those items will be referred to by the same or similar reference signs. In particular, the modified ink tank 310 may be different from the ink tank 310 described above in that a second surface 392' includes a round surface with no edge point. More specifically, the second surface 392' may have a plane section and round sections, which are connected with the plane sections and located frontward and rearward with respect to the plane section. However, as may be understood by a person with ordinary skills in the art, the form of the second surface 392' may not necessarily be limited to the modified ink tank 310 but may be, for example, in a form such that the second surface 392' has no plane section.

Fourth Embodiment

Figure 12:
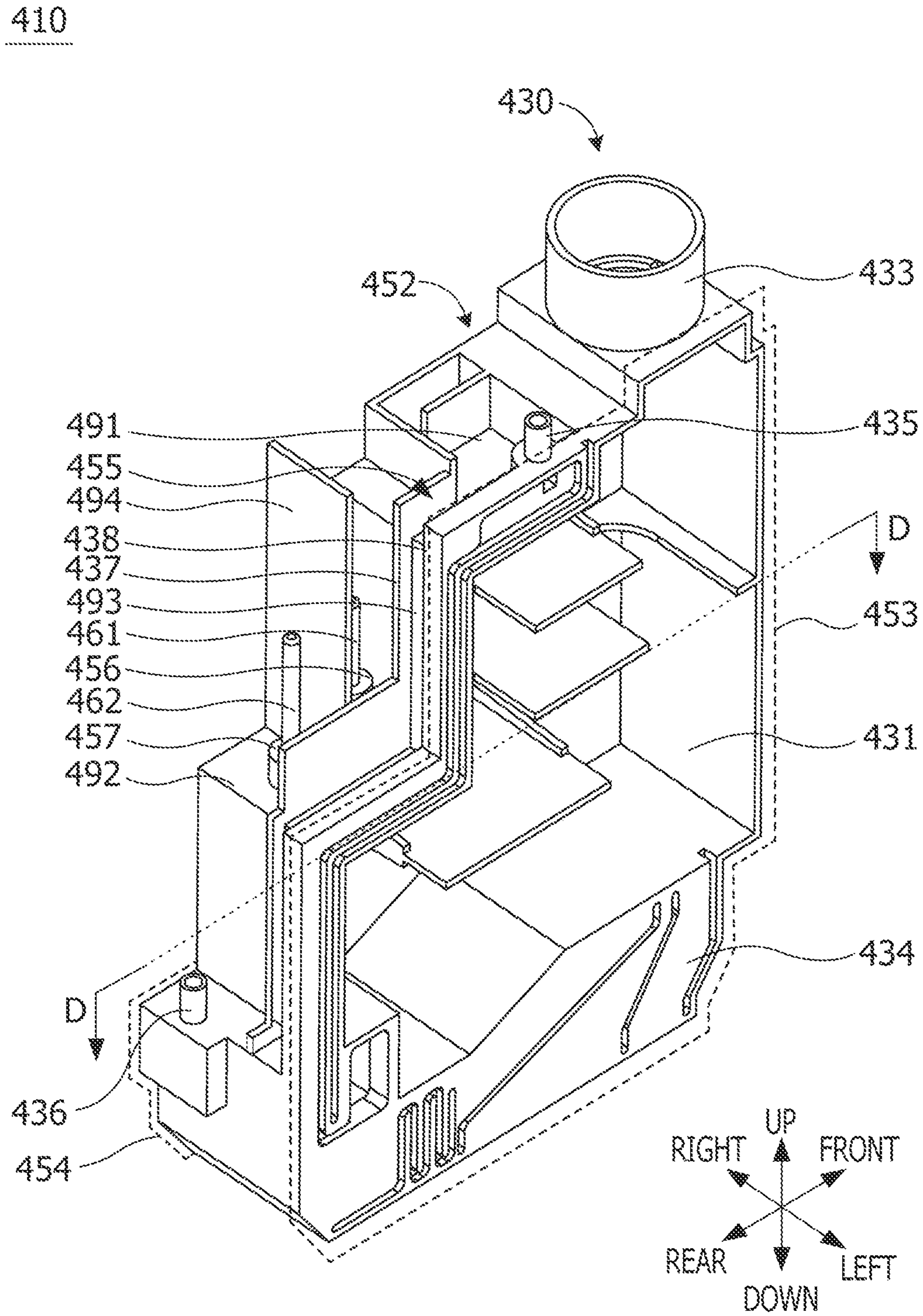
FIG. 12 is a perspective view of another ink tank mountable in the inkjet printer.
Figure 13:
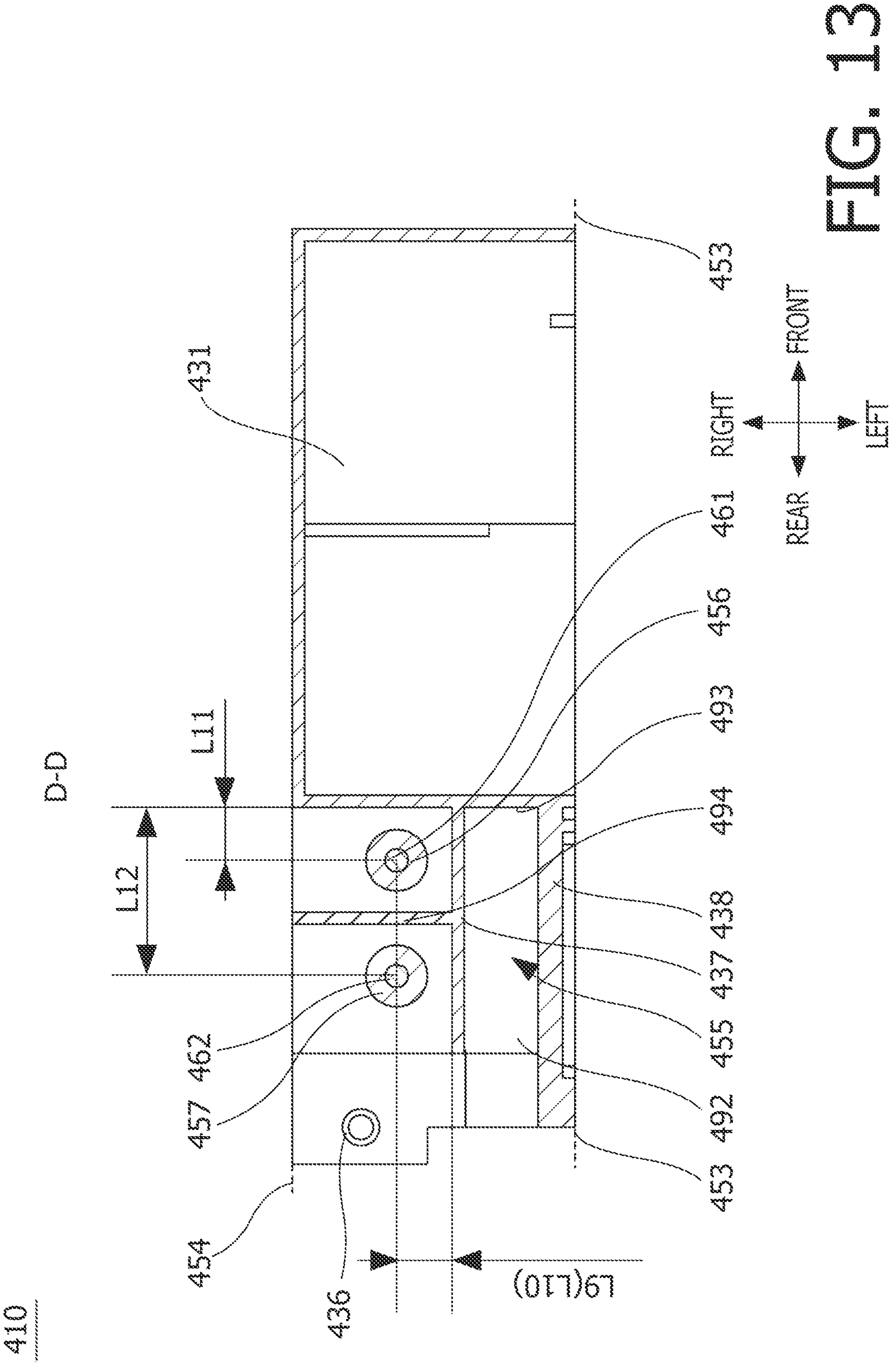
FIG. 13 is a cross-sectional view of the ink tank sectioned at a line D-D in FIG. 12.

Below described will be an ink tank 410 according to a fourth embodiment. As shown in FIGS. 12-13, some items of the ink tank 410 may be in substantially similar configurations to those in the ink tank 310 in the third embodiment. Those items will be referred to by the same or similar reference signs.

In particular, the ink tank 410 includes, similarly to the ink tank 310, an ink tank body 430, a first electrode member 461, and a second electrode member 462. The ink tank body 430 includes, similarly to the ink tank 310, a resin housing 452, a first film 453, and a second film 454. The first film 453 together with the resin housing 452 forms an ink reservoir chamber 431, similarly to the first film 353. The second film 454 together with the resin housing 452 forms a buffer chamber 434, similarly to the second film 354. An ink inlet 433, an ink supplying section 435, an air communication section 436, and a leaked-ink flow path 455, a first cover section 456, and a second cover section 457 are arranged in the resin housing 452, similarly to those in the resin housing 352. The leaked-ink flow path 455 is formed at least of a first restrictive side wall 437, a second restrictive side wall 438, a first surface 491, a second surface 492, and a connecting surface 493.

The ink tank 410 may be different from the ink tank 310 in that a lower end of the restrictive section 494 is connected with the second surface 492, and a leftward end of the restrictive section 494 is connected with the first restrictive side wall 437. In this arrangement, the first electrode member 461 and the second electrode member 462 are separated from each other. A minimum distance L9 between the first electrode member 461 and the first restrictive side wall 437 is equal to a minimum distance L10 between the second electrode member 462 and the first restrictive side wall 437. A minimum distance L11 between the first electrode member 461 and the connecting surface 493 is shorter than a minimum distance L12 between the second electrode member 462 and the connecting surface 493.

According to the ink tank 410 of the fourth embodiment, with the first electrode member 461 and the second electrode member 462 being arranged outside the leaked-ink flow path 455, the ink in the leaked-ink flow path 455 may be restrained from splashing onto the first electrode member 461 or the second electrode member 462 and from adhering to the first electrode member 461 or the second electrode member 462. Thus, erroneous detection of the amount of the ink in the ink reservoir chamber may be avoided.

Unless otherwise noted, the technical terms used in this description should fall in a same range as those usually understood by a person with ordinary skills in the technical field of the present disclosure. The terms used in this description are merely used to explain specific embodiments and are not intended to limit the present invention. For example, a term such as “arranged” may represent a state of an item being coupled directly to another item and a state of an item being coupled to another item indirectly through an intermediate item. The features described in one embodiment in the description may be applied to another embodiment alone or in combination with other features.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

The invention claimed is:

1. An ink tank usable in an inkjet printer having a recorder, the ink tank comprising:
- an ink chamber configured to store ink;
  - an ink inlet through which the ink flows into the ink chamber;
  - a first surface to which the ink inlet is connected, the first surface extending horizontally;
- a connecting surface extending in a direction intersecting with the first surface;
  - a second surface extending horizontally at a position lower than the first surface, the second surface being connected to the first surface via the connecting surface;
  - an electrode member penetrating the second surface and extending from an outside of the ink tank to the ink chamber; and
  - a restrictive section connected to the second surface, at least a part of the restrictive section being located between the connecting surface and the electrode member,
  - wherein the restrictive section extends upward beyond the first electrode member.

2. The ink tank according to claim 1, further comprising another electrode member penetrating the second surface and extending from the outside of the ink tank to the ink chamber, wherein another part of the restrictive section is located between the electrode member and the another electrode member.

3. The ink tank according to claim 1, further comprising another electrode member penetrating the second surface and extending from the outside of the ink tank to the ink chamber, wherein the part of the restrictive section is located between the electrode member and the another electrode member.

4. The ink tank according to claim 3, wherein the electrode member and the another electrode member align in a direction intersecting with the connecting surface.

5. The ink tank according to claim 3, further comprising a leaked-ink flow path configured to guide the ink leaked out of the ink inlet to a predetermined position, the leaked-ink flow path being formed at least of:
- a part of the first surface, a part of the connecting surface, and a part of the second surface,
- wherein the electrode member and the another electrode member align with a guiding direction of the leaked-ink flow path to guide the ink.

6. The ink tank according to claim 5, wherein the restrictive section is open in a direction intersecting with the guiding direction.

7. The ink tank according to claim 5, wherein the electrode member and the another electrode member are located outside the leaked-ink flow path.

8. The ink tank according to claim 1, wherein a distance between the part of the restrictive section and the electrode member is smaller than a distance between the part of the restrictive section and the connecting surface.

9. The ink tank according to claim 1, wherein the restrictive section extends along a vertical direction and has a concave horizontal cross section surrounding the electrode member.

10. The ink tank according to claim 9, wherein the restrictive section includes:

a first restrictive side wall extending from the first surface along the connecting surface to the second surface on one side of the electrode member; and a second restrictive side wall extending from the first surface along the connecting surface to the second surface on the other side of the electrode member, and the first restrictive side wall, the second restrictive side wall, and the part of the restrictive section surround the electrode member from three sides.

* * * * *